(12) United States Patent
Jang

(10) Patent No.: US 10,604,144 B2
(45) Date of Patent: Mar. 31, 2020

(54) METHOD AND APPARATUS FOR CONTROLLING POWER OF MILD HYBRID ELECTRIC VEHICLE

(71) Applicants: HYUNDAI MOTOR COMPANY, Seoul (KR); KIA MOTORS CORPORATION, Seoul (KR)

(72) Inventor: Hwa Yong Jang, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 191 days.

(21) Appl. No.: 15/833,876

(22) Filed: Dec. 6, 2017

(65) Prior Publication Data

US 2019/0143958 A1    May 16, 2019

(30) Foreign Application Priority Data

Nov. 16, 2017   (KR) .................. 10-2017-0153304

(51) Int. Cl.
*B60W 20/14*     (2016.01)
*B60W 10/08*     (2006.01)
(Continued)

(52) U.S. Cl.
CPC ............ *B60W 20/14* (2016.01); *B60W 10/08* (2013.01); *B60W 10/196* (2013.01);
(Continued)

(58) Field of Classification Search
CPC .... B60W 20/14; B60W 10/08; B60W 10/196; B60W 30/18127
(Continued)

(56) References Cited

U.S. PATENT DOCUMENTS

2003/0052650 A1* 3/2003 Gunji ................. B60K 1/02
                                                       320/155
2013/0204472 A1* 8/2013 Pfefferl ................ B60L 58/12
                                                       701/22
(Continued)

FOREIGN PATENT DOCUMENTS

JP    2012-130213 A    7/2012
JP       6067218 B2    1/2017
KR     10-1655609 B    9/2016

*Primary Examiner* — Thomas G Black
*Assistant Examiner* — Luat T Huynh
(74) *Attorney, Agent, or Firm* — Morgan, Lewis & Bockius LLP

(57) ABSTRACT

A method and an apparatus for controlling a hybrid electric vehicle are disclosed. The method includes: determining whether an uphill section is present on a driving route; calculating a regenerative braking amount at a downhill section following the uphill section; determining whether a state of charge (SOC) of a low voltage battery is equal to or greater than a first predetermined value at the time of entering the uphill section; determining whether an SOC of a high voltage battery is equal to or greater than a second predetermined value when the SOC of the low voltage battery is equal to or greater than the first predetermined value; and controlling the MHSG to generate auxiliary torque corresponding to the regenerative braking amount at the downhill section when the SOC of the high voltage battery is equal to or greater than the second predetermined value.

6 Claims, 3 Drawing Sheets

(51) Int. Cl.
*B60W 10/196* (2012.01)
*B60W 30/18* (2012.01)
(52) U.S. Cl.
CPC . *B60W 30/18127* (2013.01); *B60W 2510/244* (2013.01); *B60W 2550/142* (2013.01); *B60W 2550/20* (2013.01); *B60W 2550/402* (2013.01); *B60W 2710/083* (2013.01); *Y10S 903/906* (2013.01)
(58) Field of Classification Search
USPC .......................................................... 701/22
See application file for complete search history.

(56) References Cited

U.S. PATENT DOCUMENTS

| | | | |
|---|---|---|---|
| 2016/0368484 A1* | 12/2016 | Lee | B60W 10/06 |
| 2018/0290645 A1* | 10/2018 | Zhao | B60W 30/143 |
| 2018/0362042 A1* | 12/2018 | Ishikawa | B60W 30/162 |
| 2019/0126906 A1* | 5/2019 | Reibling | B60W 20/14 |

* cited by examiner

METHOD AND APPARATUS FOR CONTROLLING POWER OF MILD HYBRID ELECTRIC VEHICLE

CROSS-REFERENCE TO RELATED APPLICATION

This application claims priority to and the benefit of Korean Patent Application No. 10-2017-0153304 filed in the Korean Intellectual Property Office on Nov. 16, 2017, the entire contents of which are incorporated herein by reference.

BACKGROUND

(a) Field

The present disclosure relates to a hybrid electric vehicle. More particularly, the present disclosure relates to a method and an apparatus for controlling power of a hybrid electric vehicle.

(b) Description of Related Art

As is generally known in the art, a hybrid electric vehicle uses an internal combustion engine and a battery power source together. The hybrid electric vehicle efficiently combines torque of the internal combustion engine and torque of a motor.

Hybrid electric vehicles may be divided into a hard type and a mild type according to a power sharing ratio between an engine and a motor. In the case of the mild type of hybrid electric vehicle (hereinafter referred to as a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The MHSG may assist torque of the engine according to running states of the vehicle, and may charge a battery (e.g., a 48 V battery) through regenerative braking. Accordingly, fuel efficiency of the mild hybrid electric vehicle may be improved.

The disclosure of this section is to provide background of the invention. Applicant notes that this section may contain information available before this application. However, by providing this section, Applicant does not admit that any information contained in this section constitutes prior art.

SUMMARY OF

According to a method for controlling a hybrid electric vehicle, assist torque of the MHSG and regenerative braking are determined based on a state of charge (SOC) of the 48 V battery, thereby enabling efficient driving at a current time. However, since the method does not completely reflect a change of a gradient of a road, it is inefficient in consideration of an entire driving route. For example, at the time of entering a downhill section, when the SOC of the battery is high, a charging available SOC is insufficient, such that regenerative braking energy may be wasted.

The present disclosure has been made in an effort to provide a method and an apparatus for controlling power of a hybrid electric vehicle having advantages of optimizing power control of the mild hybrid electric vehicle.

A method for controlling power of a mild hybrid electric vehicle according to an embodiment of the present invention may include: determining whether an uphill section is present on a driving route; calculating a regenerative braking amount of a mild hybrid starter & generator (MHSG) at a downhill section after the uphill section when the uphill section is present on the driving route; determining whether a state of charge (SOC) of a low voltage battery is equal to or greater than a first predetermined value at the time of entering the uphill section; determining whether an SOC of a high voltage battery is equal to or greater than a second predetermined value when the SOC of the low voltage battery is equal to or greater than the first predetermined value; and controlling the MHSG to generate auxiliary torque corresponding to the regenerative braking amount at the downhill section when the SOC of the high voltage battery is equal to or greater than the second predetermined value.

The regenerative braking amount (estimated amount of charge regeneration) may be calculated based on a gradient of the downhill section, a length of the downhill section, and a traffic vehicle speed of the downhill section.

The method may further include charging the high voltage battery through power generation of the MHSG when the SOC of the high voltage battery is less than the second predetermined value.

An apparatus for controlling power of a mild hybrid electric vehicle according to an embodiment of the present invention may include: a mild hybrid starter & generator (MHSG) starting an engine or generating electricity according to an output of the engine; a navigation device providing information regarding a gradient of a road, a length of the road, and a traffic vehicle speed; a first SOC detector detecting a state of charge (SOC) of a high voltage battery; a second SOC detector detecting an SOC of a low voltage battery; a low voltage DC-DC converter (LDC) converting a voltage supplied from the high voltage battery into a low voltage; and a controller controlling operations of the MHSG and the LDC based on signals of the navigation device, the first SOC detector, and the second SOC detector, wherein the controller may determine whether an uphill section is present on a driving route, may calculate a regenerative braking amount of the mild hybrid starter & generator (MHSG) at a downhill section after the uphill section when the uphill section is present on the driving route, may determine whether the SOC of the low voltage battery is equal to or greater than a first predetermined value at the time of entering the uphill section, may determine whether the SOC of the high voltage battery is equal to or greater than a second predetermined value when the SOC of the low voltage battery is equal to or greater than the first predetermined value, and may control the MHSG to generate auxiliary torque corresponding to the regenerative braking amount at the downhill section when the SOC of the high voltage battery is equal to or greater than the second predetermined value.

The regenerative braking amount may be calculated based on a gradient of the downhill section, a length of the downhill section, and a traffic vehicle speed of the downhill section.

The controller may charge the high voltage battery through power generation of the MHSG when the SOC of the high voltage battery is less than the second predetermined value.

According to an embodiment of the present invention, power control of the mild hybrid electric vehicle may be optimized. In addition, fuel consumption of the engine may be reduced.

<Description of symbols>

Figure 1:
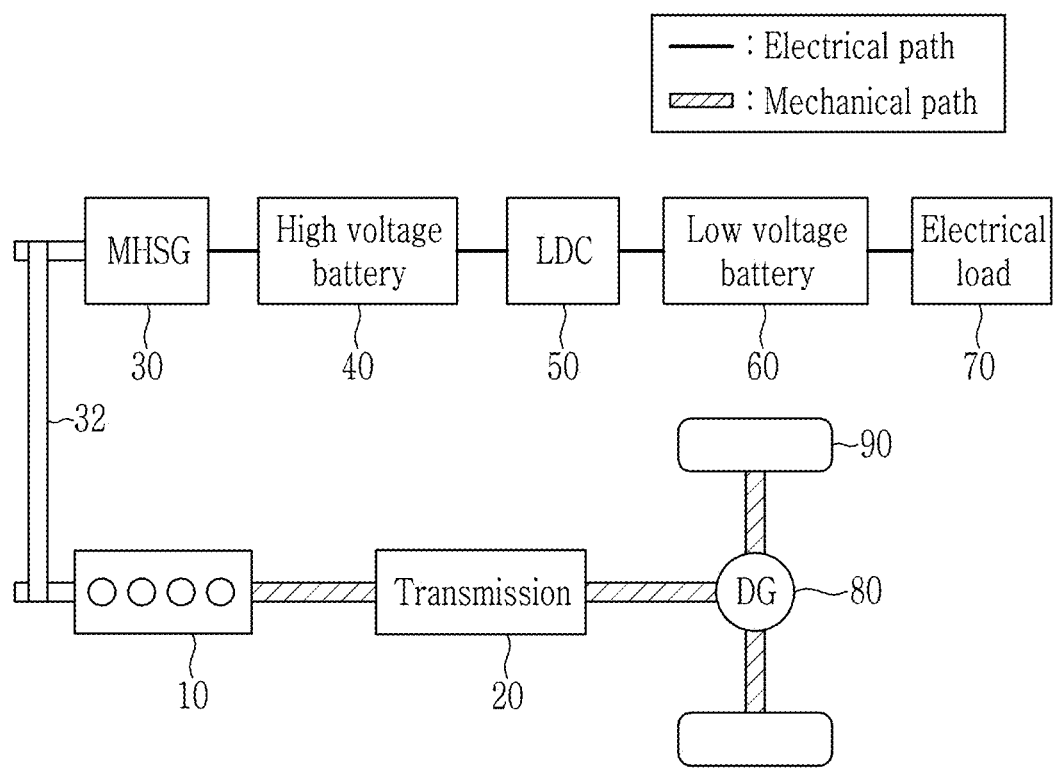
FIG. 1 is a block diagram of a mild hybrid electric vehicle according to an exemplary embodiment of the present invention.

| | |
|---|---|
| 10: engine | 20: transmission |
| 30: MHSG | 40: high voltage battery |
| 50: LDC | 60: low voltage battery |
| 70: electrical load | 80: differential gear apparatus |
| 90: wheel | 100: navigation device |
| 110: first SOC detector | 120: second SOC detector |
| 130: controller | |

DETAILED DESCRIPTION

In the following detailed description, embodiments of the present invention will be described more fully with reference to the accompanying drawings. However, the present invention is not limited the embodiments which are described herein, and may be modified in various different ways.

Parts which are not related with the description are omitted for clearly describing the exemplary embodiment of the present invention, and like reference numerals refer to like or similar elements throughout the specification.

Since each component in the drawings is arbitrarily illustrated for easy description, the present invention is not particularly limited to the components illustrated in the drawings.

An aspect of the present invention provides a method and system for controlling charging/discharging of a battery in a hybrid vehicle. A hybrid vehicle includes an engine 10, a motor/generator 40 (MHSG) for generating an assist torque while the engine is running and for generating charge from regeneration braking, a first battery 40 for supplying electrical power to the motor/generator 40 and for storing charge generated from regeneration breaking, and a second battery 60 for providing power to auxiliary devices 70 (a navigation device, audio-video device, a communication device of the vehicle). In embodiments, output voltage of the first battery 40 is higher than output voltage of the second battery 60 and a LDC 50 converts a higher voltage output of the first battery 40 to a lower voltage input for charging the second battery 60.

In embodiments, at least one controller 100 of the vehicle identifies a first segment of downhill road (within a predetermined range, time from the current location of the vehicle) on a current driving route using information from a navigation device 70. Subsequently, the controller 100 computes/estimates a first amount of charge regeneration obtainable from regeneration braking at the first segment. In embodiments, the controller computes the first amount only for a downhill road segment longer than a predetermined length. In embodiments, the controller the first amount only for an immediately upcoming downhill road segment from the current location of the vehicle.

Subsequent to estimating the first amount of charge regeneration, while driving an uphill road before the first segment of downhill road, using current SOCs of the batteries 40, 60, the controller 100 determines whether the first battery 40 and the second battery 60, alone or in combination, have enough capacity (at a starting point of the first segment) to store the first amount of charge regeneration.

If it is determined that individual one of the batteries 40, 60 or the combination of the batteries 40, 60 does not have enough capacity (Yes at S130), the controller initiates a discharging of the first battery 40 such that the first battery 40, 60 can secure a room to store the first amount of charge regeneration at a starting point of the first segment.

In embodiments, the controller initiates (1) discharging the first battery 40 to charge the second battery 60 and/or (2) discharging the first battery 40 to operate the motor/generator 60 for generating an assist torque while the vehicle is driving an uphill road before vehicle reaches the first segment of downhill (S140). In embodiments, while the vehicle is an driving an uphill road that is immediately preceding (right before) the first segment, the controller controls the motor/generator to generate an assist torque using power from the first battery 40 even when SOC of the first battery 40 is lower than a reference level that will trigger charging of the first battery 40 using power from the engine (on a normal, horizontal road). In embodiments, the controller initiates discharging of the first battery 40 only when the first amount of charge regeneration is greater than a predetermined reference.

In some embodiments, the controller initiates discharging the first battery 40 to charge the second battery 60 when (1) SOC of the first battery 40 is higher than a first predetermined reference (not enough room for the first amount of regeneration in the first battery 40) and when (2) SOC of the second battery 60 is lower than a second predetermined reference or SOC of the second battery 60 indicates enough room in the second battery 60 to receive charge from the first battery 40 to make the first battery 40 have enough room for the first amount of regeneration.

FIG. 1 is a block diagram of a mild hybrid electric vehicle according to an embodiment of the present invention.

As shown in FIG. 1, a mild hybrid electric vehicle according to an embodiment of the present invention includes an engine 10, a transmission 20, a mild hybrid starter & generator (MHSG) 30, a high voltage battery 40, a low voltage DC-DC converter 50, a low voltage battery 60, an electrical load 70, a differential gear apparatus 50, and a wheel 60.

The engine 10 burns fuel and air to convert chemical energy into mechanical energy, and various engines such as a gasoline engine and a diesel engine may be used as the engine 10.

In connection with torque transmission of a mild hybrid electric vehicle, torque generated from the engine 10 is transmitted to an input shaft of the transmission 20, and torque output from an output shaft of the transmission 20 is transmitted to an axle via the differential gear apparatus 50. The axle rotates the 60 such that the mild hybrid electric vehicle runs by the torque generated from the engine 10.

The MHSG 30 converts electrical energy into mechanical energy or converts mechanical energy into electrical energy. The MHSG 30 may start the engine 10 or generate electricity according to an output of the engine 10. In addition, the MHSG 30 may assist the torque of the engine 10. The torque of the engine 10 may be used as main torque, and torque of the MHSG 30 may be used as auxiliary torque. The engine 10 and the MHSG 30 may be connected to each other through a belt 32.

The high voltage battery 40 may supply electricity to the MHSG 30, and may be charged through electricity recovered by the MHSG 30. The battery 40 may be a 48 V battery, and may be lithium-ion battery.

The low voltage dc-to-dc converter (LDC) 50 converts a voltage supplied from the high voltage battery 40 into a low voltage (e.g., 12 V) and charges the low voltage battery 60.

The low voltage battery 60 may be charged by power supplied from the LDC 50. The low voltage battery 60 may be a 12 V battery and may supply power to the electrical load 70.

The electrical load 70 includes various electric electronic devices, such as a head lamp, an air conditioner, and a wiper, using the power of the low voltage battery 60.

Figure 2:
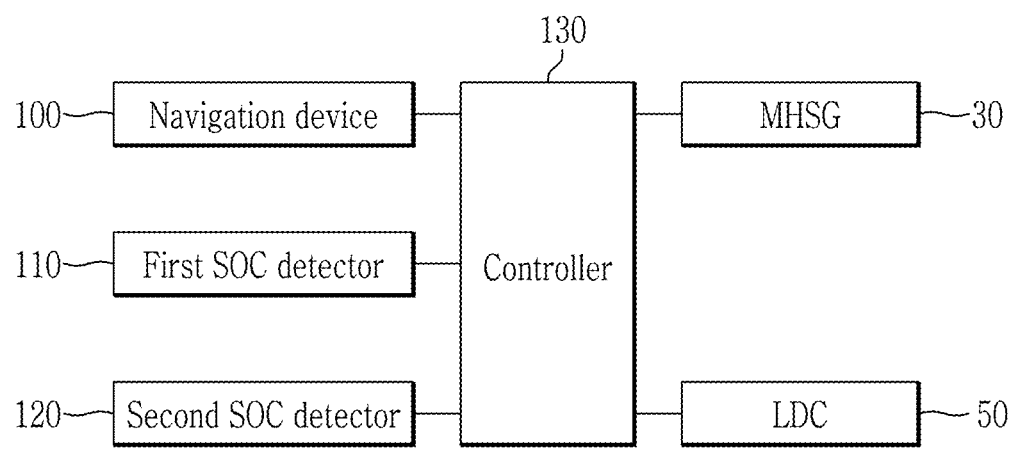
FIG. 2 is a block diagram illustrating an apparatus for controlling power of a mild hybrid electric vehicle according to an exemplary embodiment of the present invention.

FIG. 2 is a block diagram illustrating an apparatus for controlling power of a mild hybrid electric vehicle according to an embodiment of the present invention.

As shown in FIG. 2, an apparatus for controlling power of a mild hybrid electric vehicle according to an embodiment of the present invention may include a navigation device 100, a first SOC detector 110, a second SOC detector, a controller 130, the MHSG 30, and the LDC 50.

The navigation device 100 is a device which informs a driver of a route to a destination. The navigation device 100 may include an input/output portion inputting or outputting information for guidance of the route, a current position detecting portion detecting information on a current position of the hybrid electric vehicle, a memory in which map data for calculating the route and data for guiding the route are stored, and a control portion for searching the route and performing guidance of the route. The navigation device 100 may provide information regarding a gradient of a road, a length of the road, and a traffic vehicle speed.

The first SOC detector 110 detects a state of charge (SOC) of the high voltage battery 40, and transmits a signal corresponding thereto to the controller 130. Instead of directly detecting the SOC of the high voltage battery 40, a current and a voltage of the high voltage battery 40 may be measured to estimate the SOC of the high voltage battery 40.

The second SOC detector 120 detects an SOC of the low voltage battery 60, and transmits a signal corresponding thereto to the controller 130.

The controller 130 may control operations of the MHSG 30 and the LDC 50 based on signals of the navigation device 100, the first SOC detector 110, and the second SOC detector 120. The controller 130 may charge the high voltage battery 40 through power generation of the MHSG 30, and may charge the low voltage battery 60 by using power of the high voltage battery 40 by operating the LDC 50. The controller 90 may be implemented with one or more processors executed by a predetermined program, and the predetermined program may include a series of commands for performing each step included in a method for controlling power of a mild hybrid electric vehicle according to an embodiment of the present invention.

Figure 3:
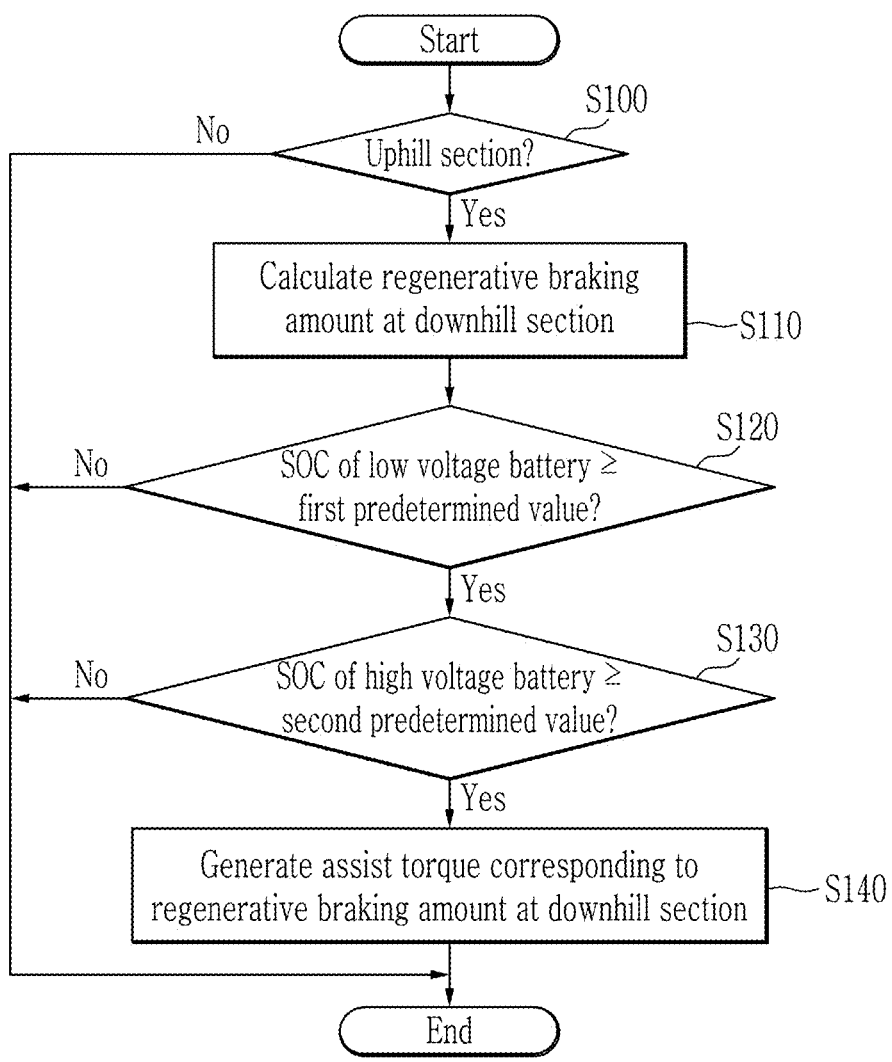
FIG. 3 is a flowchart illustrating a method for controlling power of a mild hybrid electric vehicle according to an exemplary embodiment of the present invention.

FIG. 3 is a flowchart illustrating a method for controlling power of a mild hybrid electric vehicle according to an embodiment of the present invention.

As shown in FIG. 3, the controller 130 determines whether an uphill section is present on a driving route at step S100. The controller 130 may determine whether the uphill section is present based on a gradient of a road provided from the navigation device 100.

When the uphill section is not present on the driving route at step S100, the controller 130 finishes the method for controlling power of the mild hybrid electric vehicle according to embodiments of the present invention.

When the uphill section is present on the driving route at step S100, the controller 130 calculates a regenerative braking amount of the MHSG 30 at a downhill section after the uphill section at step S110. The regenerative braking amount may be calculated based on a gradient of the downhill section, a length of the downhill section, and a traffic vehicle speed of the downhill section. Since it is expected that the high voltage battery 40 will be charged through the regenerative braking amount at the downhill section, torque of the MHSG 30 may be maximally used as auxiliary torque at the uphill section.

At the time of entering the uphill section, the controller 130 determines whether the SOC of the low voltage battery 60 is equal to or greater than a first predetermined value at step S120. The first predetermined value may be set by a person of ordinary skill in the art to determine whether the low voltage battery 60 can stably supply power to the electrical load 70 without power conversion of the LDC 50 (to charge the low voltage battery 60).

When the SOC of the low voltage battery 60 is less than the first predetermine value at step S120, the controller 130 finishes the method for controlling power of the mild hybrid electric vehicle according to embodiments of the present invention. In this case, because the power conversion of the LDC 50 may be necessary when the electrical load 70 is used, the following processes may not be executed.

When the SOC of the low voltage battery 60 is equal to or greater than the first predetermined value at step S120, the controller 130 determines whether the SOC of the high voltage battery 40 is equal to or greater than a second predetermined value at step S130. The second predetermined value may be set by a person of ordinary skill in the art to determine whether the SOC of the high voltage battery 40 is sufficient to use the torque of the MHSG 30 as auxiliary torque.

When the SOC of the high voltage battery 40 is less than the second predetermined value, the controller 130 finishes the method for controlling power of the mild hybrid electric vehicle according to embodiments of the present invention. In this case, the high voltage battery 40 may be charged through power generation of the MHSG 30.

When the SOC of the high voltage battery 40 is equal to or greater than the second predetermined value at step 130, the controller 130 may control the MHSG 30 to generate auxiliary torque corresponding to the regenerative braking amount at the downhill section at step S140. As a result, fuel consumption of the engine 10 may be reduced at the uphill section.

As described above, according to an embodiment of the present invention, power control of the mild hybrid electric vehicle may be optimized.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While this invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling power of a mild hybrid electric vehicle, comprising:
   determining whether an uphill section is present on a driving route;
   calculating a regenerative braking amount of a mild hybrid starter & generator (MHSG) at a downhill section after the uphill section when the uphill section is present on the driving route;
   determining whether a state of charge (SOC) of a low voltage battery is equal to or greater than a first predetermined value at the time of entering the uphill section;
   determining whether an SOC of a high voltage battery is equal to or greater than a second predetermined value when the SOC of the low voltage battery is equal to or greater than the first predetermined value; and
   controlling the MHSG to generate auxiliary torque corresponding to the regenerative braking amount at the downhill section when the SOC of the high voltage battery is equal to or greater than the second predetermined value.

2. The method of claim 1, wherein the regenerative braking amount is calculated based on a gradient of the downhill section, a length of the downhill section, and a traffic vehicle speed of the downhill section.

3. The method of claim 1, further comprising charging the high voltage battery through power generation of the MHSG when the SOC of the high voltage battery is less than the second predetermined value.

4. An apparatus for controlling power of a mild hybrid electric vehicle, comprising:
   a mild hybrid starter & generator (MHSG) starting an engine or generating electricity according to an output of the engine;
   a navigation device providing information regarding a gradient of a road, a length of the road, and a traffic vehicle speed;
   a first SOC detector detecting a state of charge (SOC) of a high voltage battery;
   a second SOC detector detecting an SOC of a low voltage battery;
   a low voltage DC-DC converter converting a voltage supplied from the high voltage battery into a low voltage; and
   a controller controlling operations of the MHSG and the LDC based on signals of the navigation device, the first SOC detector, and the second SOC detector,
   wherein the controller determines whether an uphill section is present on a driving route, calculates a regenerative braking amount of the mild hybrid starter & generator (MHSG) at a downhill section after the uphill section when the uphill section is present on the driving route, determines whether the SOC of the low voltage battery is equal to or greater than a first predetermined value at the time of entering the uphill section, determines whether the SOC of the high voltage battery is equal to or greater than a second predetermined value when the SOC of the low voltage battery is equal to or greater than the first predetermined value, and controls the MHSG to generate auxiliary torque corresponding to the regenerative braking amount at the downhill section when the SOC of the high voltage battery is equal to or greater than the second predetermined value.

5. The apparatus of claim 4, wherein the regenerative braking amount is calculated based on a gradient of the downhill section, a length of the downhill section, and a traffic vehicle speed of the downhill section.

6. The apparatus of claim 4, wherein the controller charges the high voltage battery through power generation of the MHSG when the SOC of the high voltage battery is less than the second predetermined value.

* * * * *